US012714039B2

(12) United States Patent
Ruegemer et al.

(10) Patent No.: US 12,714,039 B2
(45) Date of Patent: Aug. 25, 2026

(54) PLANT MATERIAL PROCESSING

(71) Applicant: PRO MAC MANUFACTURING LTD., Duncan (CA)

(72) Inventors: Thomas Ruegemer, Holdingford, MN (US); Gary David Powers, Duncan (CA); Kyle Warren Goodwin, Duncan (CA); Wendell Devries, Duncan (CA)

(73) Assignee: PRO MAC MANUFACTURING LTD., Duncan (CA)

( * ) Notice: Subject to any disclaimer, the term of this patent is extended or adjusted under 35 U.S.C. 154(b) by 406 days.

(21) Appl. No.: 18/549,873

(22) PCT Filed: Mar. 24, 2021

(86) PCT No.: PCT/US2021/023955
§ 371 (c)(1),
(2) Date: Sep. 8, 2023

(87) PCT Pub. No.: WO2022/203671
PCT Pub. Date: Sep. 29, 2022

(65) Prior Publication Data
US 2024/0147921 A1 May 9, 2024

(51) Int. Cl.
*A01G 23/06* (2006.01)
*B27L 11/02* (2006.01)

(52) U.S. Cl.
CPC .............. *A01G 23/06* (2013.01); *B27L 11/02* (2013.01)

(58) Field of Classification Search
CPC .... A01G 23/06; A01G 23/062; A01G 23/067; A01D 34/73; A01D 34/733; B27L 11/02
(Continued)

(56) References Cited

U.S. PATENT DOCUMENTS 4,360,166 A 11/1982 Biersack
4,477,029 A 10/1984 Green
(Continued)

FOREIGN PATENT DOCUMENTS

CA 3021802 A1 10/2017
CA 3006315 A1 * 11/2018 ........... A01D 34/005
WO WO0207501 A1 1/2002

OTHER PUBLICATIONS

CA-3006315-A1 (Year: 2018).*
(Continued)

*Primary Examiner* — Christopher J Sebesta
*Assistant Examiner* — Evan A Bregel
(74) *Attorney, Agent, or Firm* — Kolitch Romano Dascenzo Gates LLP

(57) ABSTRACT

An apparatus for facilitating processing of plant material is disclosed. The apparatus includes a base, a cutter disc rotatably coupled to the base such that the cutter disc is configured to rotate about an axis of rotation relative to the base, the cutter disc having an upper side including a plurality of radially spaced teeth, each of the plurality of teeth configured to travel on a respective cutting path to engage and shear the plant material when the cutter disc rotates. The apparatus includes a shearing governor rigidly coupled to the base, the shearing governor including one or more cutting edges, each of the one or more cutting edges extending adjacent to the cutting paths of at least two of the plurality of teeth and configured to shear the plant material when the cutter disc rotates. Other systems and apparatuses are disclosed.

12 Claims, 14 Drawing Sheets

(58) Field of Classification Search
USPC .................................................... 37/301, 302
See application file for complete search history.

(56) References Cited

U.S. PATENT DOCUMENTS

| | | | | |
|---|---|---|---|---|
| 5,042,730 | A | 8/1991 | Hundt | |
| 5,358,189 | A | 10/1994 | Vandermolen | |
| 5,605,291 | A | 2/1997 | Doskocil | |
| 5,931,396 | A | 8/1999 | Firdaus | |
| 6,076,265 | A * | 6/2000 | Huang Lo .............. | A01D 34/76 56/255 |
| 7,798,436 | B2 | 9/2010 | Cornelius | |
| 10,631,466 | B2 | 4/2020 | Kanchibhotla | |
| 2009/0026296 | A1 | 1/2009 | Isley | |
| 2010/0181399 | A1 | 7/2010 | Cornelius | |
| 2011/0100508 | A1 | 5/2011 | Fraley | |
| 2016/0044866 | A1 | 2/2016 | Nelson | |
| 2021/0051852 | A1 * | 2/2021 | Angelastro .......... | A01D 75/185 |

OTHER PUBLICATIONS

International Search Report and Written Opinion of the International Searching Authority from the U.S. Patent Office, in PCT/US2021/023955 dated Mar. 24, 2021, which is an international application to which this application claims priority.

Skid-Steer Forestry Disc Mulcher. Brochure [online]. Diamond Mowers, 2021 [retrieved on Feb. 11, 2021]. Retrieved from the Internet: <URL: https://info.diamondmowers.com/hubfs/Skid-Steer-Forestry-Disc-Mulcher-Brochure.pdf>.

CID Skid Steer Forestry Disc Mulcher Attachment. Datasheet [online]. Skid Steer Solutions, 2020 [retrieved on Jan. 20, 2021]. Retrieved from the Internet: <URL: https://www.skidsteersolutions.com/skid-steer-forestry-disc-mulcher-attachment-cid/>.

Mulching Heads: Bad Ax (Skid Steer). Datasheet [online]. Loftness Manufacturing, 2021 [retrieved on Jan. 20, 2021]. Retrieved from the Internet: <URL: https://www.loftness.com/products/vegetation-management/mulching-heads/bad-ax-skid-steer/features>.

Diamond Mower Attachments For Sale. Datasheet [online]. Lano Equipment, 2021 [retrieved Jan. 20, 2021]. Retrieved from the Internet: <URL: https://lanoequip.com/diamond-mowers>.

The Rage™ Forestry Mulching Mower 901352—Quick Attach Parts. Datasheet [online]. Quick Attach Attachments, LLC, 2021 [retrieved Jan. 20, 2021]. Retrieved from the Internet: <URL: https://parts.quickattach.com/collections/the-rage™-forestry-mulching-mower-901352>.

Screen captures from YouTube video clip entitled "Disc Mulcher or Drum Mulcher—Which is better for forestry work and land clearing," 1 page, uploaded on Nov. 16, 2018 by user "Stanley "Dirt Monkey" Genadek". Retrieved from Internet: <URL: https://www.youtube.com/watch?v=HrXzrcNQJcc>.

Screen captures from YouTube video clip entitled "RDM Disc Mulcher Excavator Forestry Mulcher - Advanced Forest Equipment," 1 page, uploaded on Nov. 14, 2016 by user "AdvancedForest". Retrieved from Internet: <URL: https://www.youtube.com/watch?v=XffErTpRbeM>.

Screen captures from YouTube video clip entitled "Cold weather brush mulching," 1 page, uploaded on Jan. 4, 2018 by user "bert26a". Retrieved from Internet: <URL: https://www.youtube.com/watch?v=3sUgCAV2_bc>.

* cited by examiner

PLANT MATERIAL PROCESSING

BACKGROUND

1. Field

Embodiments of this disclosure relate to plant material processing and more particularly to facilitating processing of plant material using a cutter disc.

2. Description of Related Art

Some known devices for processing plant material may use cutter discs for mulching trees. Some disc mulching equipment may be focused on processing material using the underside or bottom of the cutter disc to process standing timber and brush from the top down. Although some known disc mulching equipment may provide top side mulching as a secondary process, such devices may jam and/or may not be capable of quickly and effectively receiving and processing input plant material.

SUMMARY

In accordance with various embodiments, there is provided an apparatus for facilitating processing of plant material. The apparatus includes a base, a cutter disc rotatably coupled to the base such that the cutter disc is configured to rotate about an axis of rotation relative to the base, the cutter disc having an upper side including a plurality of radially spaced teeth, each of the plurality of teeth configured to travel on a respective cutting path to engage and shear the plant material when the cutter disc rotates. The apparatus includes a shearing governor rigidly coupled to the base, the shearing governor including one or more cutting edges, each of the one or more cutting edges extending adjacent to the cutting paths of at least two of the plurality of teeth and configured to shear the plant material when the cutter disc rotates.

The shearing governor may include a governing surface configured to guide the plant material when the cutter disc rotates.

The governing surface may be parallel to the axis of rotation.

The governing surface may be obliquely angled relative to directions of the cutting paths of the teeth such that the governing surface is configured to urge plant material rotating with the upper side of the cutter disc towards the axis of rotation when the cutter disc rotates.

The governing surface may be generally planar.

The apparatus may include a cover mounted to the base and covering at least a portion of the upper side of the cutter disc, the cover defining an inlet exposing at least a portion of the upper side of the cutter disc and a covered passage extending from the inlet, the covered passage adjacent to the upper side of the cutter disc, wherein the governing surface extends from the cover to narrow the covered passage at a location spaced apart from the inlet.

The shearing governor may include a flat plate, the governing surface may include a surface of the flat plate, and the one or more cutting edges may include a transverse cutting edge adjacent to and axially spaced from the cutting paths of at least two of the plurality of teeth, the transverse cutting edge including a right angled corner of the flat plate.

The one or more cutting edges may include a transverse cutting edge adjacent to and axially spaced from the cutting paths of at least two of the plurality of teeth.

The transverse cutting edge may extend above the cutter disc for a length of more than about half of a radius of the cutter disc.

The transverse cutting edge may extend above the cutter disc for a length of more than about 80% of the radius of the cutter disc.

Each of the one or more cutting edges may be an inner cutting edge and the shearing governor may include an outer cutting edge oriented generally parallel to the axis of rotation, the outer cutting edge axially overlapping with and radially spaced from the cutting path of at least one of the plurality of teeth.

The outer cutting edge and the transverse cutting edge may form a continuous cutting edge.

The shearing governor may be removably coupled to the base via at least one fastener.

The one or more cutting edges of the shearing governor may include at least one interposed cutting edge disposed between respective cutting paths of two of the plurality of teeth.

In accordance with various embodiments, there is provided a system for facilitating processing of plant material. The system includes any of the above described apparatuses and a drive system coupled to the apparatus and configured to drive the cutter disc of the apparatus to cause the cutter disc to rotate relative to the base of the apparatus.

Other aspects and features of embodiments of the present disclosure will become apparent to those ordinarily skilled in the art upon review of the following description of specific embodiments of the present disclosure in conjunction with the accompanying figures.

BRIEF DESCRIPTION OF THE DRAWINGS

In drawings which illustrate embodiments of the present disclosure.

DETAILED DESCRIPTION

Figure 1:
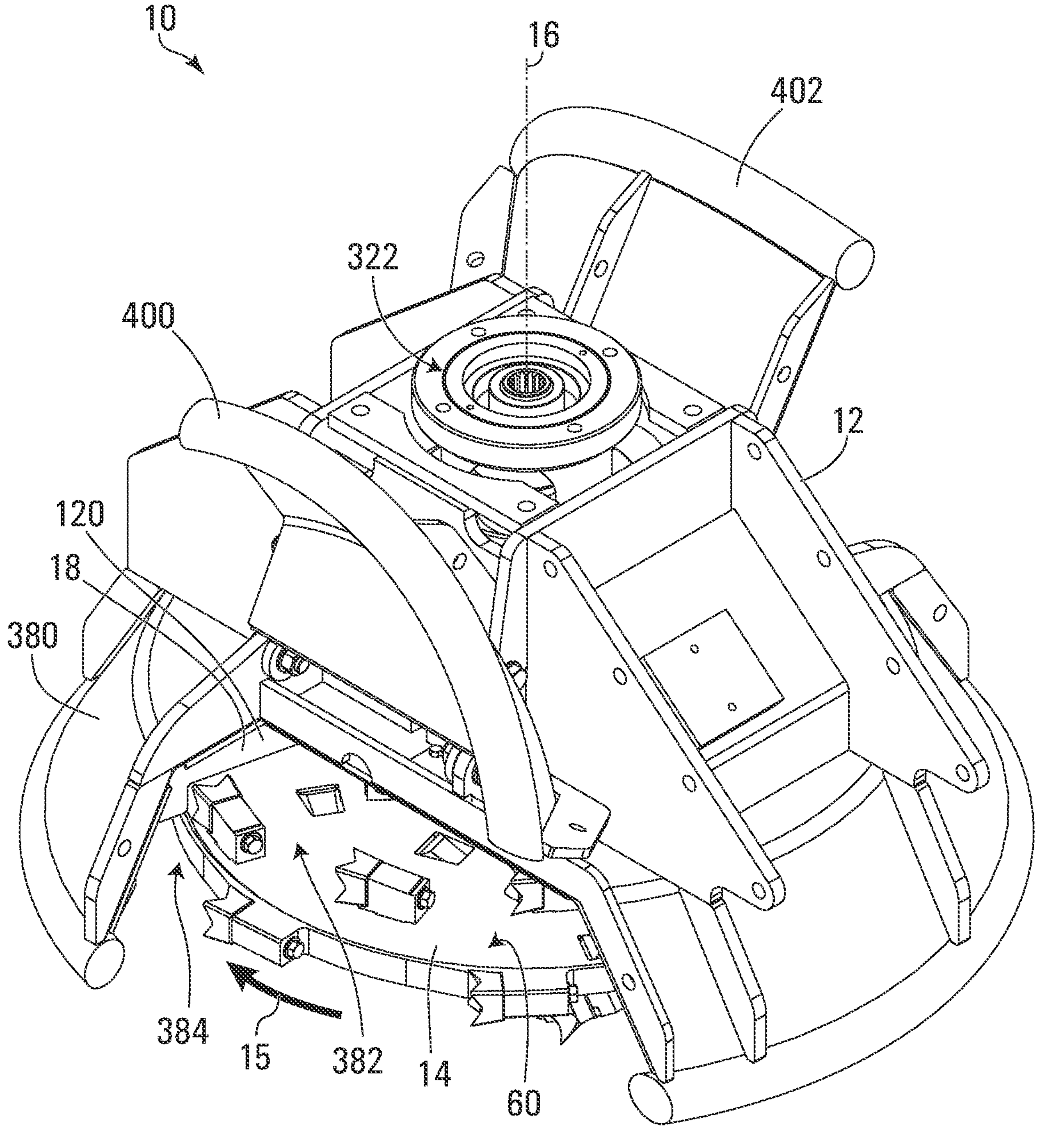
FIG. 1 is a perspective view of an apparatus for facilitating processing of plant material, according to various embodiments.

Referring to FIG. 1, there is shown an apparatus 10 for facilitating processing of plant material, according to various embodiments. In various embodiments, the apparatus 10 may provide improved processing capabilities for rotary disc style mulching or shearing of trees and/or other plant material. In some embodiments, the apparatus 10 may provide improved top side disc mulching for plant processing.

Referring to FIG. 1, the apparatus 10 includes a base 12 and a cutter disc 14 rotatably coupled to the base 12 such that the cutter disc 14 is configured to rotate about an axis of rotation 16 relative to the base 12. The direction of rotation of the cutter disc 14 is shown by arrow 15 in FIG. 1. In various embodiments, the apparatus 10 may include a rotatable connector (seen for example in FIG. 4), which may include a drive axis and bearings for facilitating the rotatable coupling between the cutter disc 14 and the base 12.

Figure 2:
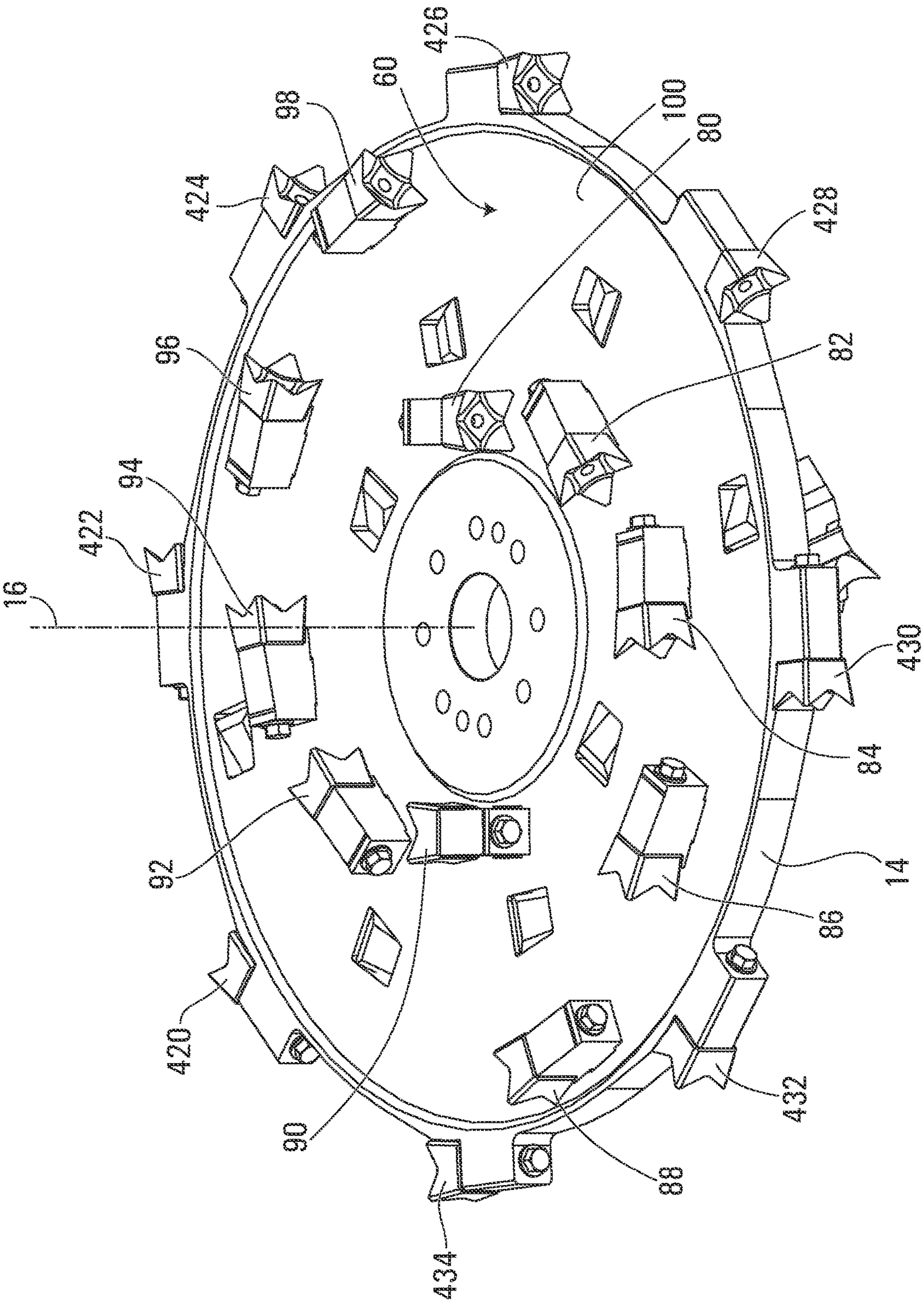
FIG. 2 is a perspective view of a cutter disc of the apparatus shown in FIG. 1 according to various embodiments.

Referring to FIG. 1, the cutter disc 14 has an upper side 60 including radially spaced teeth. Referring to FIG. 2, the cutter disc 14 is shown in further detail including the upper side 60 having a first set of radially spaced teeth 80, 82, 84, 86, and 88. In various embodiments, each of the teeth 80-88 may be configured to travel on a respective cutting path to engage and shear or mulch plant material when the cutter disc 14 rotates about the axis 16. In various embodiments, the teeth 80-88 may be positioned in a spiral pattern that may facilitate the drawing in of plant material on cutter disc 14. Referring to FIG. 2, in various embodiments, the upper side 60 of the cutter disc 14 may include a second set of radially spaced teeth 90, 92, 94, 96, and 98, which may be spaced generally similarly to the teeth 80-88 but rotated 180 degrees and may function generally similarly to the teeth 80-88.

In various embodiments, the cutter disc 14 may include a cutter base 100 made of a strong material, such as, for example steel, and the teeth 80-98 may be coupled to the cutter base 100 or disc via welding and/or bolting, for example. In various embodiments, the teeth 80-98 may be bolted to holders that may be bolted onto the cutter base 100, welded to the cutter base 100, and/or integral to the cutter base 100 (e.g., machined from the material forming the cutter base 100). In various embodiments, the teeth 80-98 may be a quad style (as shown in FIG. 2). In some embodiments, the teeth 80-98 may be another tooth style having at least one cutting edge. In some embodiments, the teeth 80-98 may be carbide tipped, which may facilitate better wear properties.

Referring to FIG. 1, in various embodiments, the apparatus 10 includes a shearing governor 18 rigidly coupled to the base 12. In various embodiments, the shearing governor 18 may remain stationary as the teeth 80-98 (shown in FIG. 2, for example) pass by under the shearing governor. In various embodiments, the shearing governor 18 may facilitate shearing or cutting of the plant material and/or may facilitate drawing the plant material in for processing. In some embodiments, the shearing governor 18 may be welded or bolted to the base 12 and/or a frame rigidly coupled to the base 12, for example.

Figure 3:
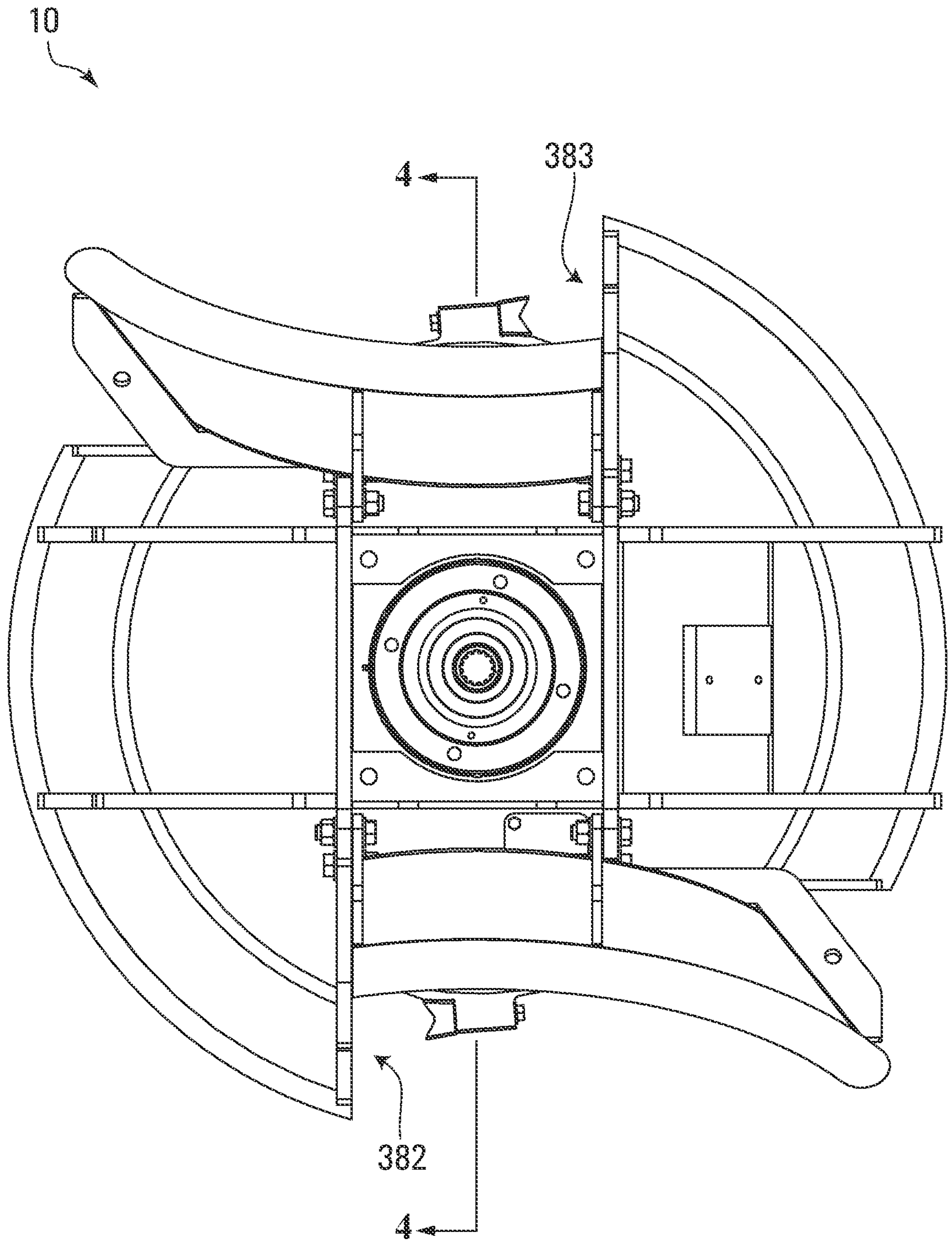
FIG. 3 is a top view of the apparatus shown in FIG. 1 according to various embodiments.
Figure 4:
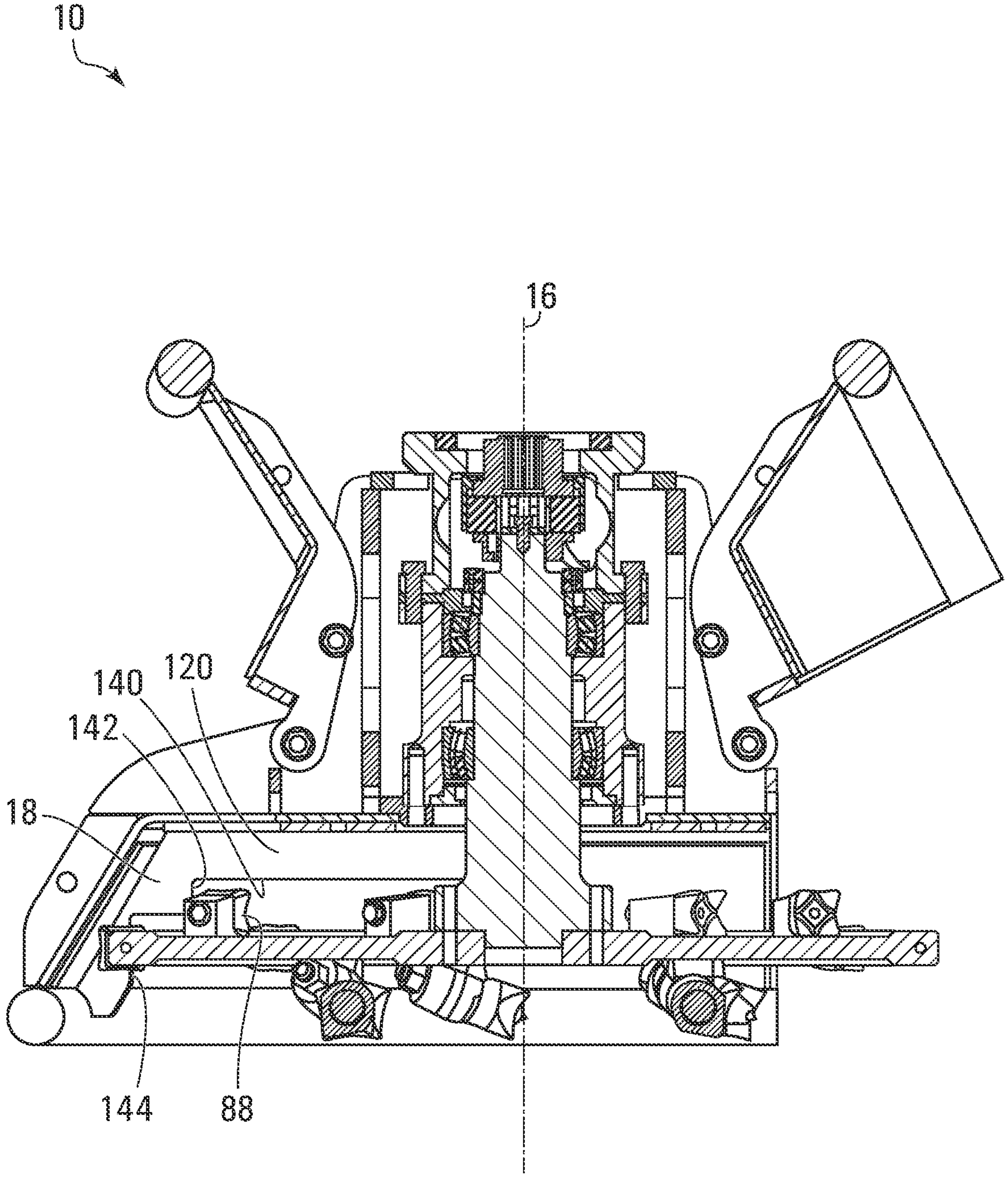
FIG. 4 is a front sectional view of the apparatus shown in FIG. 1 according to various embodiments.

Referring to FIG. 3, a top view of the apparatus 10 is provided which depicts a cross-section upon which a sectional view shown in FIG. 4 is taken. Referring to FIG. 4, there is shown a front sectional view of the apparatus 10 showing the shearing governor 18 in further detail. In various embodiments, the shearing governor 18 may include a transverse cutting edge 140. In various embodiments, the transverse cutting edge 140 may be adjacent to and axially spaced from the cutting paths of the teeth 80-98. For example, in some embodiments, the transverse cutting edge 140 may extend above and across the cutting paths of the teeth 80-98, such that the teeth 80-98 pass below the transverse cutting edge 140 as the cutter disc 14 rotates.

In various embodiments, the transverse cutting edge 140 extending adjacent to and axially spaced from at least two of the cutting paths of the teeth 80-98 may facilitate shearing of plant material both radially aligned with the teeth 80-98 and between cutting paths of the teeth 80-98, which may reduce jamming during plant processing and/or increase productivity during processing.

In some embodiments, the transverse cutting edge 140 may be within a threshold proximity of the cutting paths of the teeth 80-98 to facilitate shearing. For example, in some embodiments, the transverse cutting edge 140 may have a clearance spacing of about 5 mm of each of the teeth 80-98 such that the minimum distance between the teeth 80-98 and the transverse cutting edge 140 during rotation of the cutter disc 14 is about 0.5 inches. In various embodiments, a clearance of between about 0.5 inches and about 2 inches may be used.

In some embodiments, the transverse cutting edge 140 may extend above the cutter disc 14 for a length of more than about half of a radius of the cutter disc 14. In some embodiments, this may facilitate the transverse cutting edge 140 engaging and shearing plant material at a high processing rate, without jamming during operation. In some embodiments, the transverse cutting edge 140 may extend above the cutter disc 14 for a length of more than about 80% of the radius of the cutter disc 14. In some embodiments, the transverse cutting edge 140 extending for a length of more than about 80% of the radius of the cutter disc 14 may facilitate particularly efficient processing of the plant material without jamming during operation.

In various embodiments, the shearing governor 18 may include a governing surface 120 configured to guide the plant material when the cutter disc 14 rotates. In various embodiments, the governing surface 120 may extend along the length of one or more of the cutting edges of the shearing governor 18. In some embodiments, the shearing governor 18 may include a flat plate, such as a metal plate, made of a hard strong material, such as, for example, QT-100 steel, having a thickness to avoid bending, such as for example, about 0.5 inches. In various embodiments, the governing surface 120 may include a surface of the plate. In various embodiments, the transverse cutting edge 140 may include a corner of the plate, which may be a right-angled corner, for example. Thus, in some embodiments, the shearing governor 18 may include a leading 90-degree angle corner, which may act as the transverse cutting edge 140. In various embodiments, using a rigid cutting edge such as the transverse cutting edge 140 in close proximity to the cutting paths of the teeth 80-98 may facilitate increased rates of receiving and processing input plant material without jamming of the plant material in the apparatus 10 and/or reduced requirements for further processing.

Figure 5:
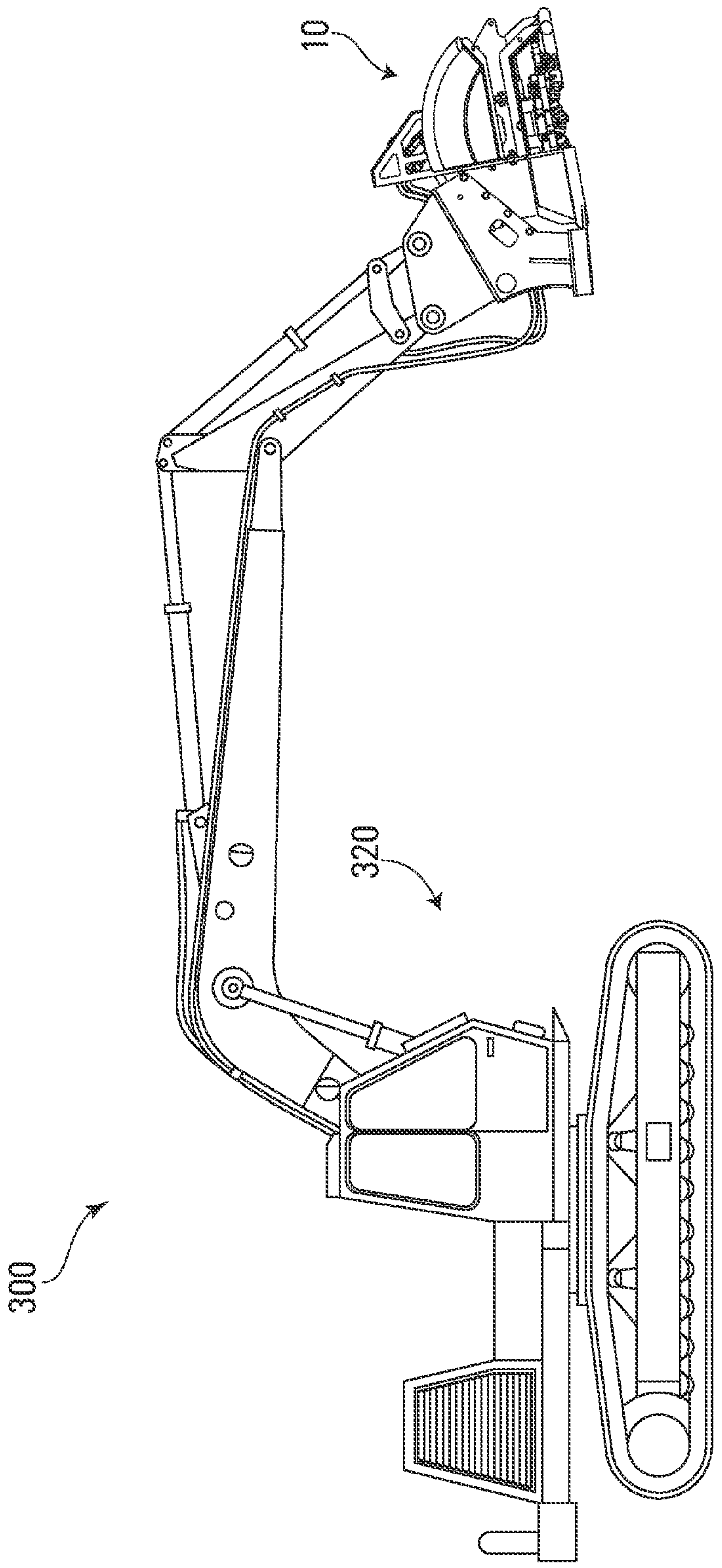
FIG. 5 is a side view of a system for facilitating processing of plant material including the apparatus shown in FIG. 1 according to various embodiments.

Referring now to FIG. 5, a system 300 for facilitating processing of plant material according to various embodiments is shown. The system 300 includes the apparatus mounted to or coupled to a drive system 320. In various embodiments, the drive system 320 may be configured to couple to the apparatus 10 and configured to drive the cutter disc 14 of the apparatus 10 to cause the cutter disc to rotate relative to the base 12 of the apparatus 10. In various embodiments, the drive system 320 may be configured to couple to the base 12 and a drive input 322 of the apparatus 10 (shown in FIG. 1). For example, in some embodiments, the drive system 320 may include a mobile drive system, such as an excavator or a skid steer having a mount configured to couple to the base 12 and a drive shaft configured to couple to the drive input 322. In some embodiments, the mount may be welded to the excavator and bolted to the base 12. In some embodiments, a stationary drive system may be used as the drive system 320. In various embodiments, the drive system 320 may be configured to cause the cutter disc 14 to rotate at about 1800 rpm, for example.

In various embodiments, the drive system 320 and/or the apparatus 10 coupled thereto may be maneuvered such that plant material, including a tree or tree trunk, for example, is introduced to the upper side 60 of the cutter disc 14 shown in FIG. 1 while the cutter disc 14 rotates. For example, in some embodiments, the apparatus may be positioned such that an outer edge of the cutter disc 14 cuts a tree near the trees base and upper sections of the tree stand generally vertical above the upper side 60 of the cutter disc 14. In various embodiments, gravity may draw the plant material downward towards the upper side 60 of the cutter disc 14. In various embodiments, the plant material may be engaged by the teeth 80-98 of the cutter disc 14 and forced towards the shearing governor 18. The transverse cutting edge 140 of the shearing governor 18 may shear the plant material in cooperation with the teeth 80-98 shearing the plant material at or near the governor as the teeth 80-98 pass by the transverse cutting edge 140.

Referring to FIG. 1, in various embodiments, the governing surface 120 of the shearing governor 18 may be generally parallel to the axis of rotation 16. Accordingly, in various embodiments, the governing surface 120 may be generally perpendicular to the upper side 60 of the cutter disc. In various embodiments, this may result in the governing surface 120 not pushing plant material axially downwards towards the cutter disc 14 and also not pulling plant material away from the cutter disc 14. In various embodiments, the governing surface 120 being parallel to the axis of rotation may help to facilitate high throughput of plant processing while also reducing jamming of plant material in between the shearing governor 18 and the cutter disc 14.

Figure 6:
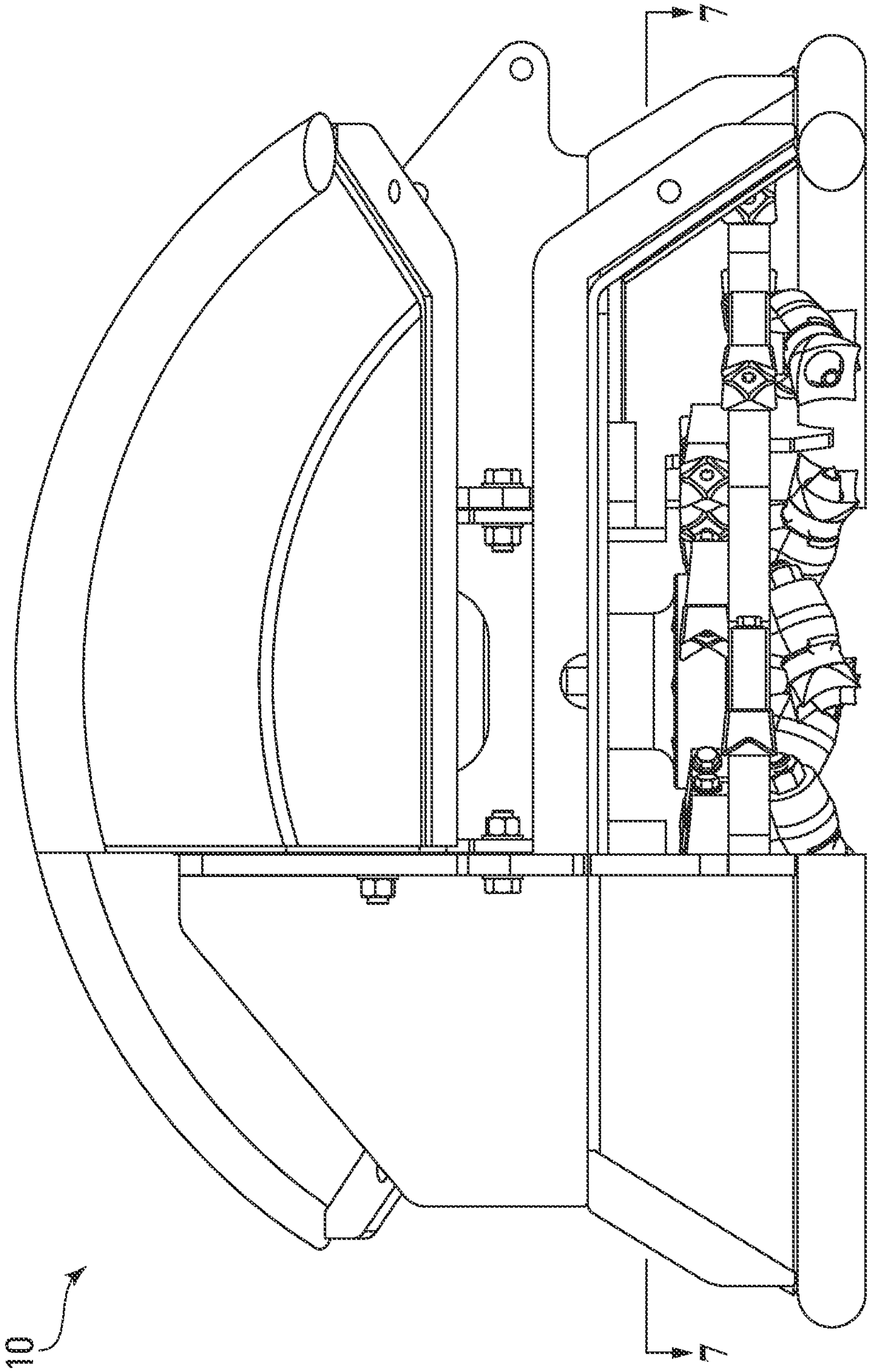
FIG. 6 is a side view of the apparatus shown in FIG. 1 according to various embodiments.
Figure 7:
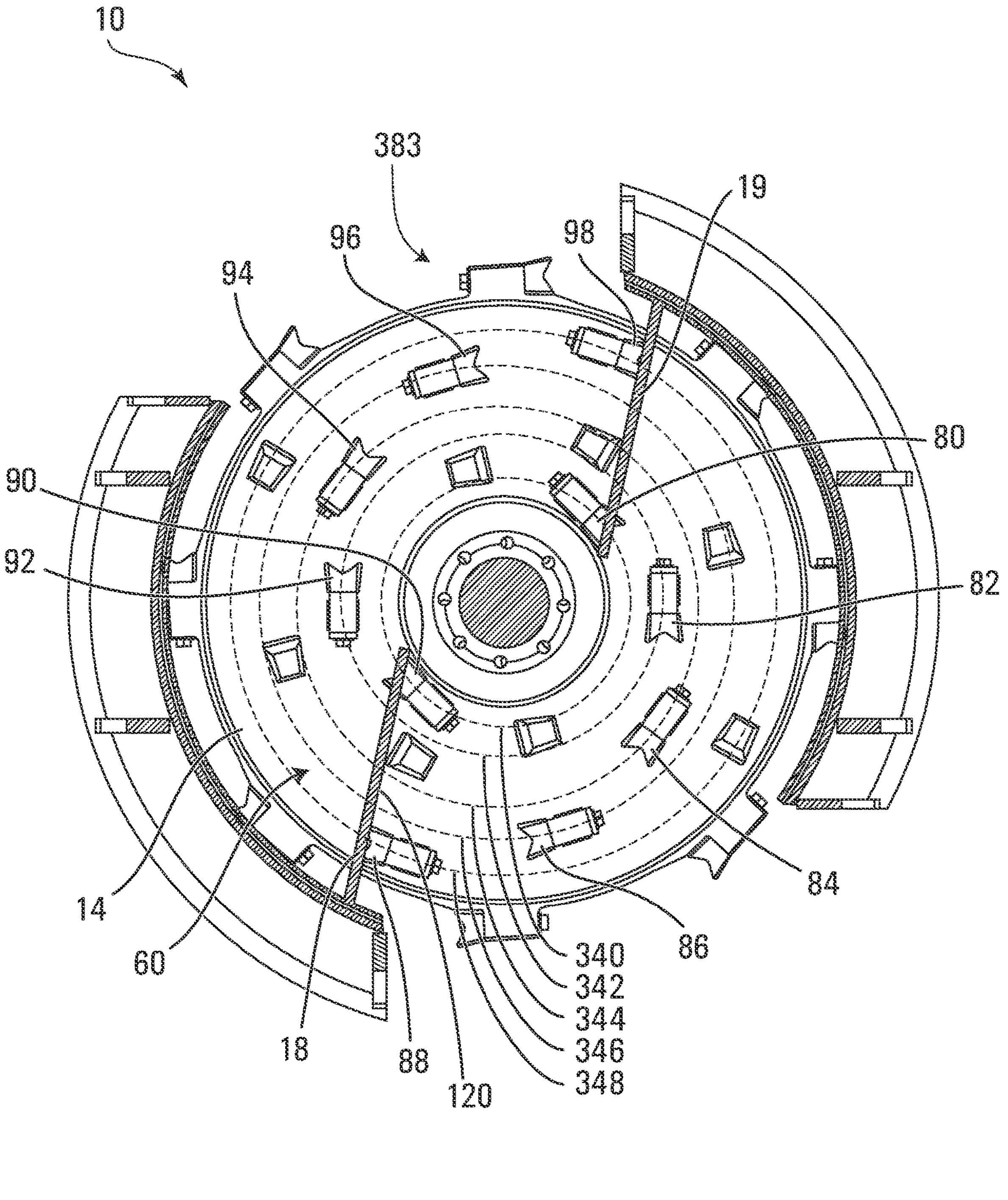
FIG. 7 is a top sectional view of the apparatus shown in FIG. 1 according to various embodiments.

Referring now to FIG. 6, a side view of the apparatus 10 depicting a cross-section upon which a sectional view shown in FIG. 7 is taken. Referring to FIG. 7, the sectional view of the apparatus 10 is provided, which shows the upper side 60 of the cutter disc 14 and a cross section of the shearing governor 18. Referring to FIG. 7, representations cutting paths 340, 342, 344, 346, and 348 of the teeth 80, 82, 84, 86, and 88 respectively are shown by stippled lines. In various embodiments, the teeth 90, 92, 94, 96, and 98 may be spaced generally similarly to the teeth 80-88 and so the cutting paths of the teeth 90-98 may also be represented by the cutting paths 340, 342, 344, 346, and 348.

In various embodiments, the governing surface 120 of the shearing governor may be obliquely angled relative to directions of the cutting paths 340, 342, 344, 346, and 348 of the teeth 80-98. Thus, in some embodiments, the governing surface may extend not radially from the axis 16, but rather at a non-right angle relative to respective directions of the cutting paths of the teeth 80-98. The angles of the governing surface 120 relative to directions of the cutting paths can be seen in the top view provided by FIG. 7, for example.

In various embodiments, the governing surface 120 being obliquely angled relative to directions of the cutting paths may facilitate gathering of plant material inwards by the cutter disc 14 as the teeth 80-98 and the governing surface 120 engage and/or shear the plant material. In various embodiments, any angle greater than 90 degrees when viewing the surface looking downward along the axis of rotation 16 may be used to facilitate material gathering of plant material towards the center of rotation. For example, in some embodiments, the angle between the cutting paths and the governing surface 120 may be greater than about 102 degrees.

In some embodiments, the governing surface 120 may be generally planar. In various embodiments, the governing surface 120 being generally planar may facilitate reduced jamming and/or ease of manufacturing of the shearing governor 18 including the governing surface and the transverse cutting edge 140.

Referring to FIG. 1, in various embodiments, the apparatus 10 may include a cover 380 mounted to the base 12 and covering at least a portion of the upper side 60 of the cutter disc 14, the cover 380 defining an inlet or opening 382 exposing at least a portion of the upper side 60 of the cutter disc 14. In various embodiments, the shearing governor 18 may be located at a position offset from inlet 382. Thus, in various embodiments, the cover 380 may define a covered passage 384 extending from the inlet 382, the covered passage adjacent to the upper side 60 of the cutter disc 14, wherein the governing surface 120 extends from the cover 380 to narrow the covered passage at a location spaced apart from the inlet.

Referring to FIG. 1, the covered passage 384 may be defined between the cover 380 and the cutter disc 14 and may extend from the inlet 382 to the shearing governor 18. In various embodiments, the cover 380 may provide a barrier or wall displaced axially from the cutter disc 14. In various embodiments, the apparatus 10 including the covered passage 384 and the governing surface 120 being displaced from the inlet 382 of the cover 380 may facilitate controlled drawing in and/or holding of the plant material during shearing and/or rotation of the cutter disc 14. In some embodiments, the governing surface 120 may be at least about 2.5 inches from the inlet 382 when the cutter disc 14 has a diameter of about 36 inches, for example. In some embodiments, the governing surface 120 may be at least about 5 inches from the inlet 382 when the cutter disc 14 has a diameter of about 52 inches, for example. In various embodiments, the cover 380 may be mounted or rigidly coupled to the base 12 such as by welding or bolting, for example.

In various embodiments, the apparatus 10 may include doors 400 and 402 having pivotable connectors or hinges for connecting to the cover 380 to selectively expose respective portions of the upper side 60 of the cutter disc 14. In FIG. 1, the doors 400 and 402 are shown in an open configuration wherein portions of the upper side 60 of the cutter disc 14 are exposed, such that plant material may enter the inlet 382, and engage the upper side 60 of the cutter disc 14.

Referring to FIG. 4, in various embodiments, the shearing governor 18 may include a first outer cutting edge 142 extending generally parallel to the axis of rotation 16, the first outer cutting edge 142 axially overlapping with and radially spaced from a cutting path of at least one cutting tooth. For example, in some embodiments, the first outer cutting edge 142 may be adjacent to and axially overlap with the cutting path 348 of the cutting teeth 88 and 98 (shown in FIG. 2, for example). In various embodiments, the radial spacing between the first outer cutting edge 142 and the cutting path of the cutting teeth 88 and 98 may be generally similar to the axial spacing between the transverse cutting edge 140 and the cutting teeth 80-98.

In various embodiments, the first outer cutting edge 142 and the transverse cutting edge 140 may cooperate to facilitate shearing of plant material that engages with the upper side 60 of the cutter disc 14 while reducing jamming. In some embodiments, a continuous cutting edge formed on the shearing governor 18 may include the first outer cutting edge 142 and the transverse cutting edge 140. In various embodiments, use of a continuous cutting edge to provide the transverse cutting edge 140 and the first outer cutting edge 142 may facilitate efficient and effective processing of the plant material and may reduce the likelihood that plant material get jammed in the apparatus 10.

Referring to FIG. 2, in some embodiments, the cutter disc 14 may include outer cutting teeth 420, 422, 424, 426, 428, 430, 432, and 434, which are disposed on a radially outer edge of the cutter base 100. Referring to FIG. 4, in various embodiments, the shearing governor 18 may include a second outer cutting edge 144 oriented generally parallel to the axis of rotation 16, the second outer cutting edge 144 axially overlapping with and radially spaced from cutting path of the outer cutting teeth 420-434.

Figure 8:
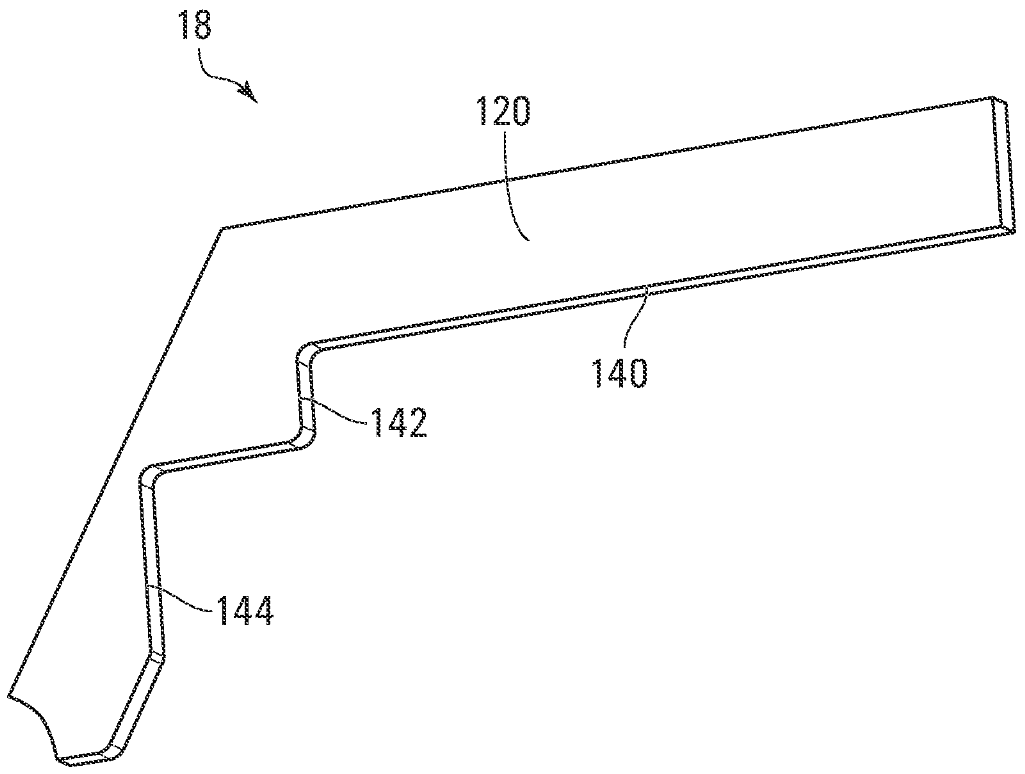
FIG. 8 is a lower perspective view of a shearing governor of the apparatus shown in FIG. 1 according to various embodiments.

Referring to FIG. 8, there is shown a view of the shearing governor 18 alone, including the governing surface 120, transverse cutting edge 140, first outer cutting edge 142, and second outer cutting edge 144, according to various embodiments.

Referring to FIG. 3, in various embodiments, the inlet 382 may be a first inlet and the apparatus 10 may include a second inlet 383, which may be generally similar to the inlet 382 but rotated 180 degrees about the axis 16 relative to the inlet 382. In various embodiments, the first and second inlets 382 and 383 may be positioned on the sides of the apparatus 10, generally 90 degrees away from a mount at which the drive system 320 couples to the apparatus 10.

In various embodiments, the shearing governor 18 may be a first shearing governor and the apparatus 10 may include a second shearing governor 19 generally similar to the first shearing governor 18 but rotated 180 degrees about the axis 16. In various embodiments, including the second inlet 383 and the second shearing governor 19 may facilitate increased productivity due to being able to process from both sides of the apparatus 10. In some embodiments, including the second inlet 383 may reduce jamming, because the second inlet may act as an outlet for plant material received at the first inlet 382.

Figure 9:
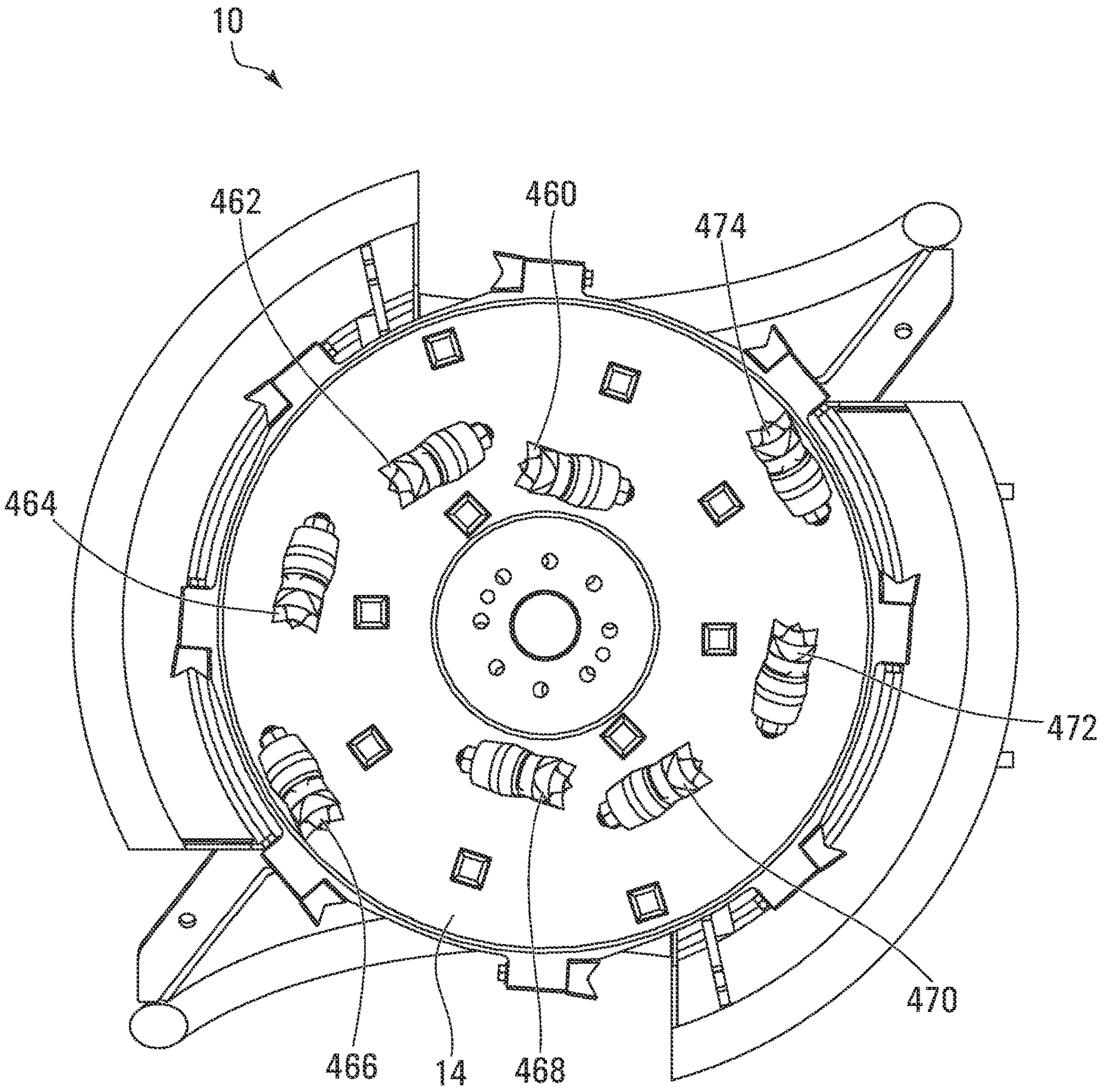
FIG. 9 is a bottom view of the apparatus shown in FIG. 1 according to various embodiments.

Referring to FIG. 9, there is shown the apparatus 10 from a bottom view. Referring to FIG. 9, the cutter disc 14 includes bottom teeth 460-474, which may be configured to shear or mulch plant material that engages with the underside or bottom of the cutter disc 14. In various embodiments, the bottom teeth 460-474 may include various tooth types, such as, for example, quad teeth, carbide tipped single point (bullet) teeth, another tooth type, or a combination thereof.

In various embodiments, an apparatus generally similar to the apparatus 10 described above and shown in FIGS. 1 to 9 may include fewer, additional or alternative shearing governors and/or cutting edges on the shearing governors. In various embodiments, an apparatus generally similar to the apparatus 10 described above and shown in FIGS. 1 to 9 may include additional or alternative cutter discs, which may work in cooperation, for example.

Figure 10:
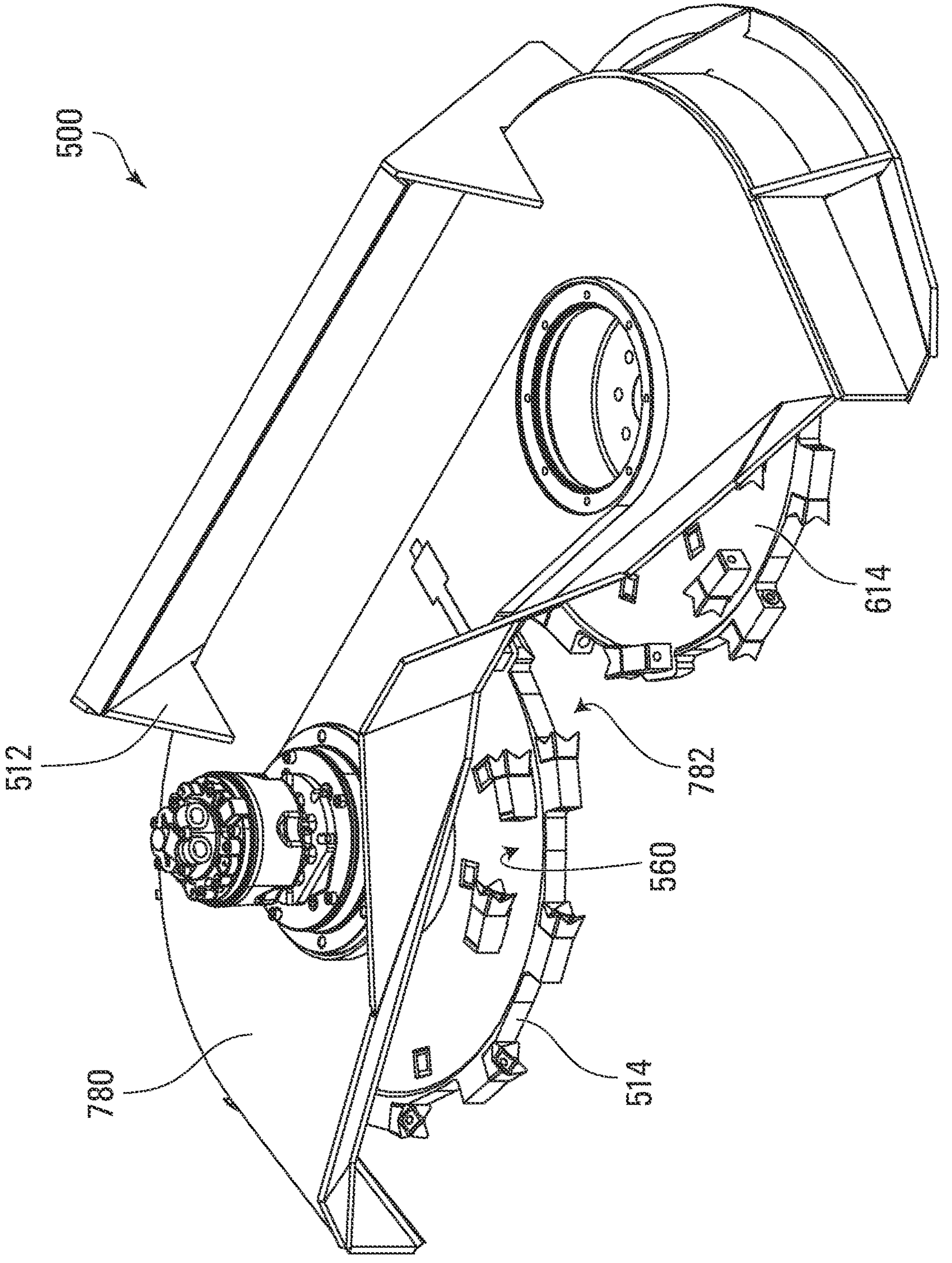
FIG. 10 is a perspective view of an apparatus for facilitating processing of plant material, according to various embodiments.

Referring to FIG. 10, there is shown an apparatus 500 for facilitating processing of plant material, according to various embodiments. In various embodiments, the apparatus 500 may include some generally similar features to the apparatus 10 shown in FIGS. 1 to 9. Referring to FIG. 10, the apparatus 500 includes a base 512 and cutter discs 514 and 614 rotatably coupled to the base 512 such that the cutter discs 514 and 614 are configured to rotate about respective axes of rotation relative to the base 512. In various embodiments, the cutter discs 514 and 614 may be configured to counter rotate, to draw plant material in for processing near a center of the apparatus 500. In some embodiments, each of the cutter discs 514 and 614 may include generally similar features to the cutter disc 14 shown in FIGS. 1-9 and described above. In various embodiments, the apparatus 500 may be used and/or driven with a drive system generally as described above having regard to the apparatus 10 shown in FIGS. 1-9.

Figure 11:
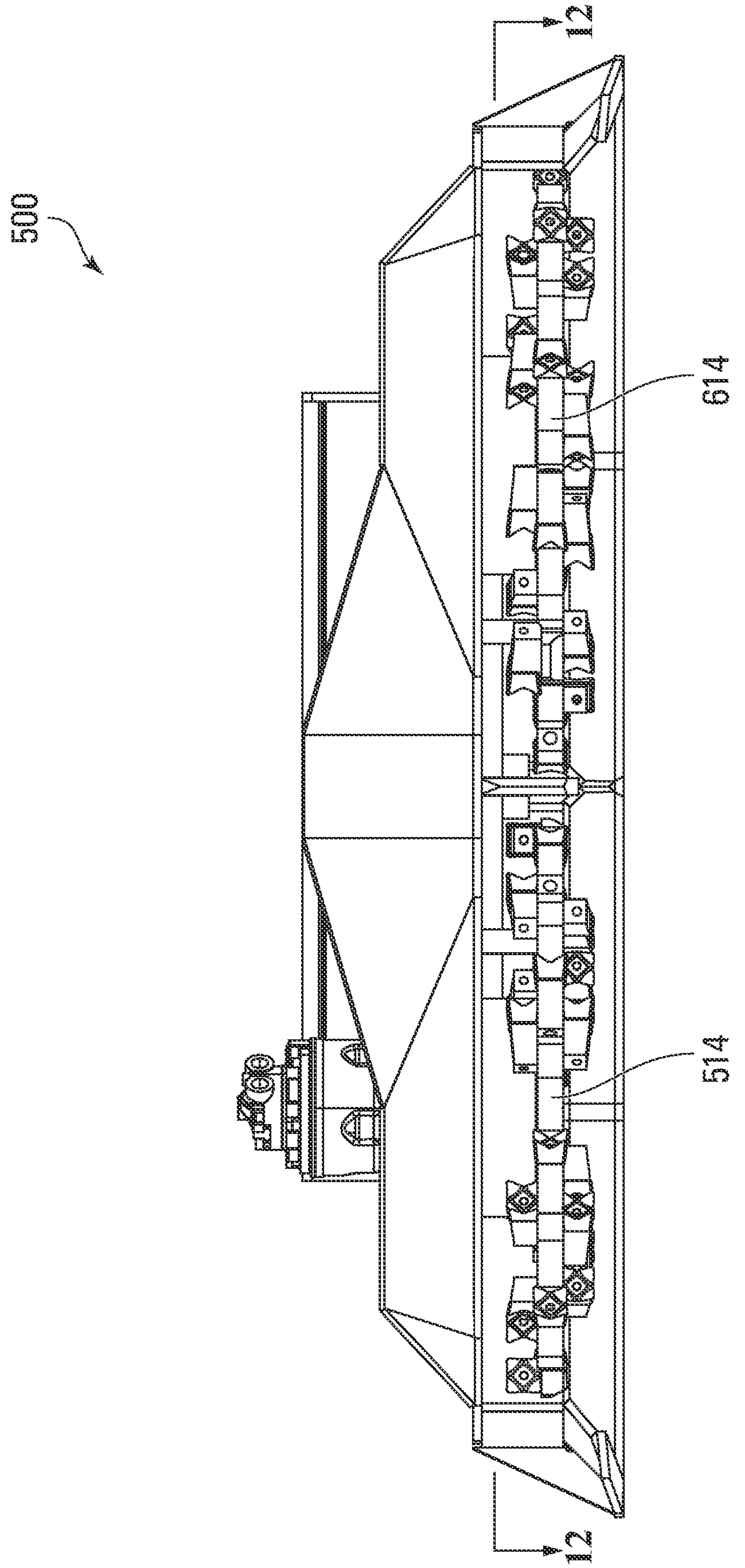
FIG. 11 is a front view of the apparatus shown in FIG. 10 according to various embodiments.
Figure 12:
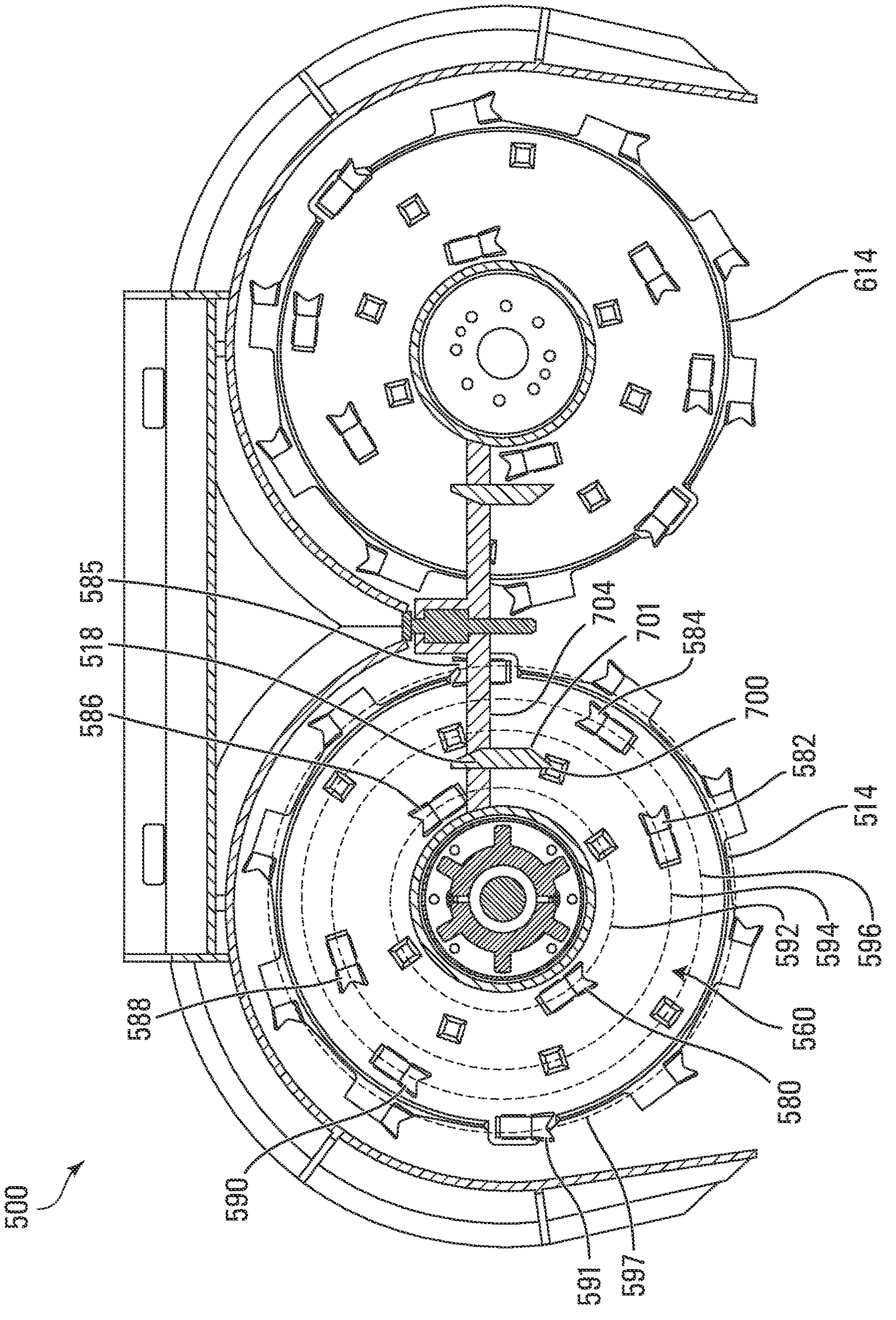
FIG. 12 is a top sectional view of the apparatus shown in FIG. 10 according to various embodiments.

Referring to FIG. 11, the apparatus 500 is shown from a front view, depicting a section along which a sectional FIG. 12 is taken. Referring to FIG. 12, the cutter disc 514 includes an upper side 560 having radially spaced teeth 580, 582, 584, and 585 each configured to travel on a respective cutting path 592, 594, 596, and 597 to engage and shear plant material when the cutter disc 514 rotates. In various embodiments, the cutter disc 514 may also include radially spaced teeth 586, 588, 590, and 591 generally similar to the teeth 580, 582, 584, and 585 but spaced 180 degrees relative thereto.

Figure 13:
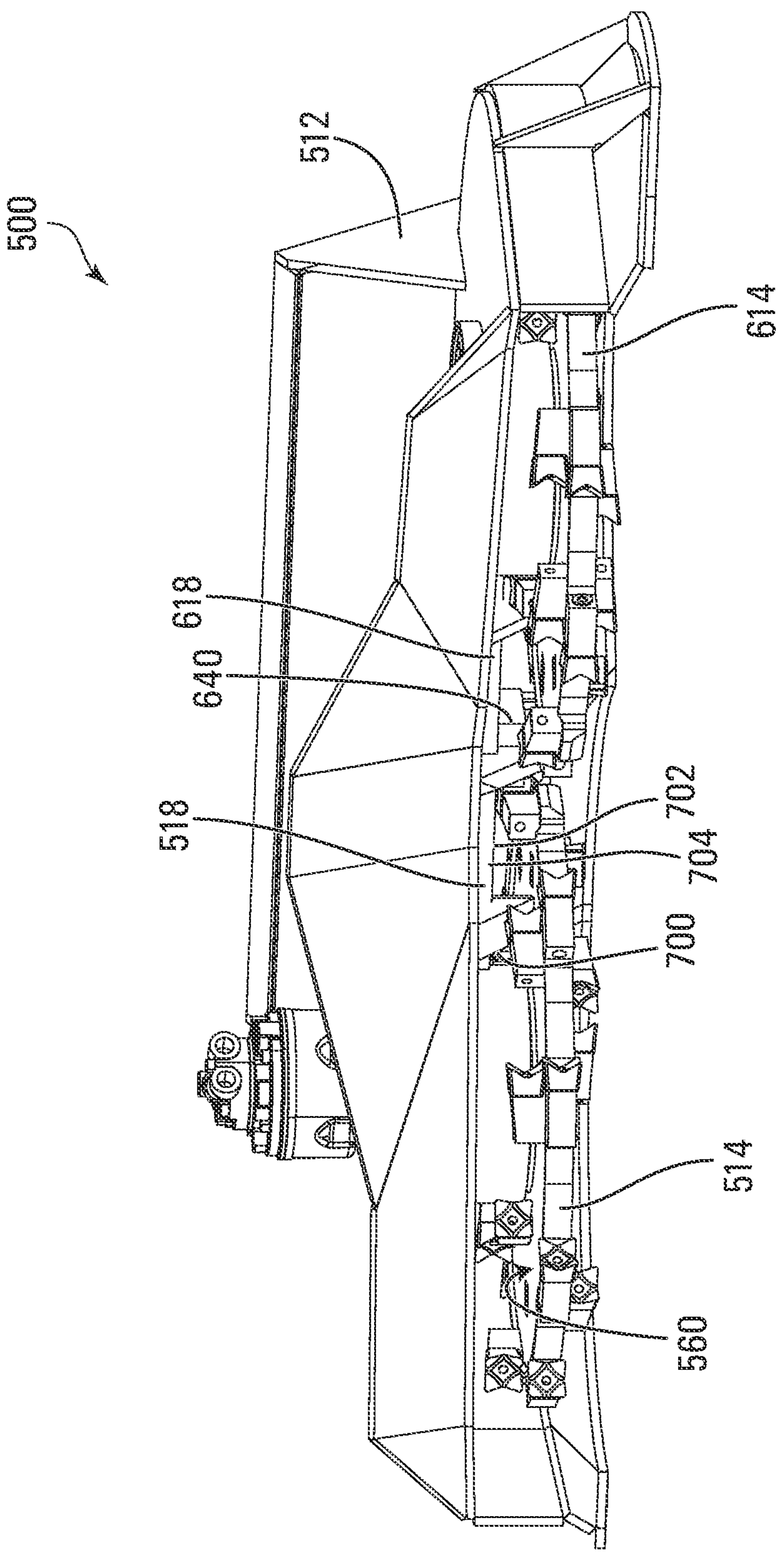
FIG. 13 is a front perspective view of the apparatus shown in FIG. 10 according to various embodiments.

Referring to FIGS. 12 and 13, in various embodiments, the apparatus 500 includes a shearing governor 518 rigidly coupled to the base 512, the shearing governor 518 including an interposed cutting edge 700 extending adjacent to the cutting paths 592 and 594 of the teeth 580 and 582 respectively, configured to shear plant material when the cutter disc 514 rotates. In various embodiments, the interposed cutting edge 700 being adjacent to and between two cutting paths may facilitate efficient processing or shearing of the plant material by the apparatus 10 when the cutter disc 514 rotates, such as, by reducing the amount of plant material that may rotate with the cutter disc 514 unimpeded. In various embodiments, a spacing or clearance between the interposed cutting edge 700 and the tooth 580 as it passes by the interposed cutting edge 700 during rotation of the cutter disc 514 may be about 0.5 to 2 inches, for example. In various embodiments, a spacing or clearance between the interposed cutting edge 700 and the tooth 582 as it passes by the interposed cutting edge 700 during rotation of the cutter disc 514 may be about 0.5 to 2 inches, for example. In some embodiments, the shearing governor 518 may include an edge 701, generally parallel to the first cutting edge 700.

Referring to FIG. 13, the apparatus 500 is shown from a front side angled view to show the shearing governor 518 in further detail. Referring to FIG. 12, in various embodiments, the interposed cutting edge 700 may extend at an angle relative to the axis of rotation of the cutter disc 514 such that plant material is biased towards the upper side 560 of the cutter disc 514 during engagement and/or shearing by the interposed cutting edge 700.

Referring still to FIG. 13, the shearing governor 518 includes a transverse cutting edge 702 and a governing surface 704. In various embodiments, the governing surface 704 may be configured to guide the plant material when the cutter disc 514 rotates. In various embodiments, the governing surface 704 may be parallel to the axis of rotation of the cutter disc 514. In various embodiments, the governing surface 704 may be generally planar. Referring to FIG. 12, in various embodiments, the governing surface 704 may be obliquely angled relative to directions of the cutting paths 592, 594 596, and 597 such that the governing surface 704 is configured to urge plant material rotating with the upper side 560 of the cutter disc 514 towards the axis when the cutter disc 514 rotates.

Referring to FIG. 10, in various embodiments, the apparatus 500 may include a cover 780 mounted to the base 512 and covering at least a portion of the upper side 560 of the cutter disc, the cover 780 defining an inlet 782 exposing at least a portion of the upper side 560 of the cutter disc 514 and a covered passage extending from the inlet, the covered passage adjacent to the upper side of the cutter disc, wherein the governing surface 704 (shown in FIG. 12) extends from the cover 780 to narrow the covered passage at a location spaced apart from the inlet.

In various embodiments, the transverse cutting edge 702 and the interposed cutting edge 700 may be inner cutting edges and the shearing governor 518 may include an outer cutting edge oriented generally parallel to the axis of rotation of the cutter disc, the outer cutting edge axially overlapping with and radially spaced from the cutting path 597 of the teeth 585 and 591.

In various embodiments, the features described above including the cutter disc 514 may be generally mirrored across the apparatus 500 such that the cutter disc 614 functions generally as described above for the cutter disc 514. In various embodiments, an outer cutting edge 640 of a shearing governor 618 is shown in FIG. 13.

Figure 14:
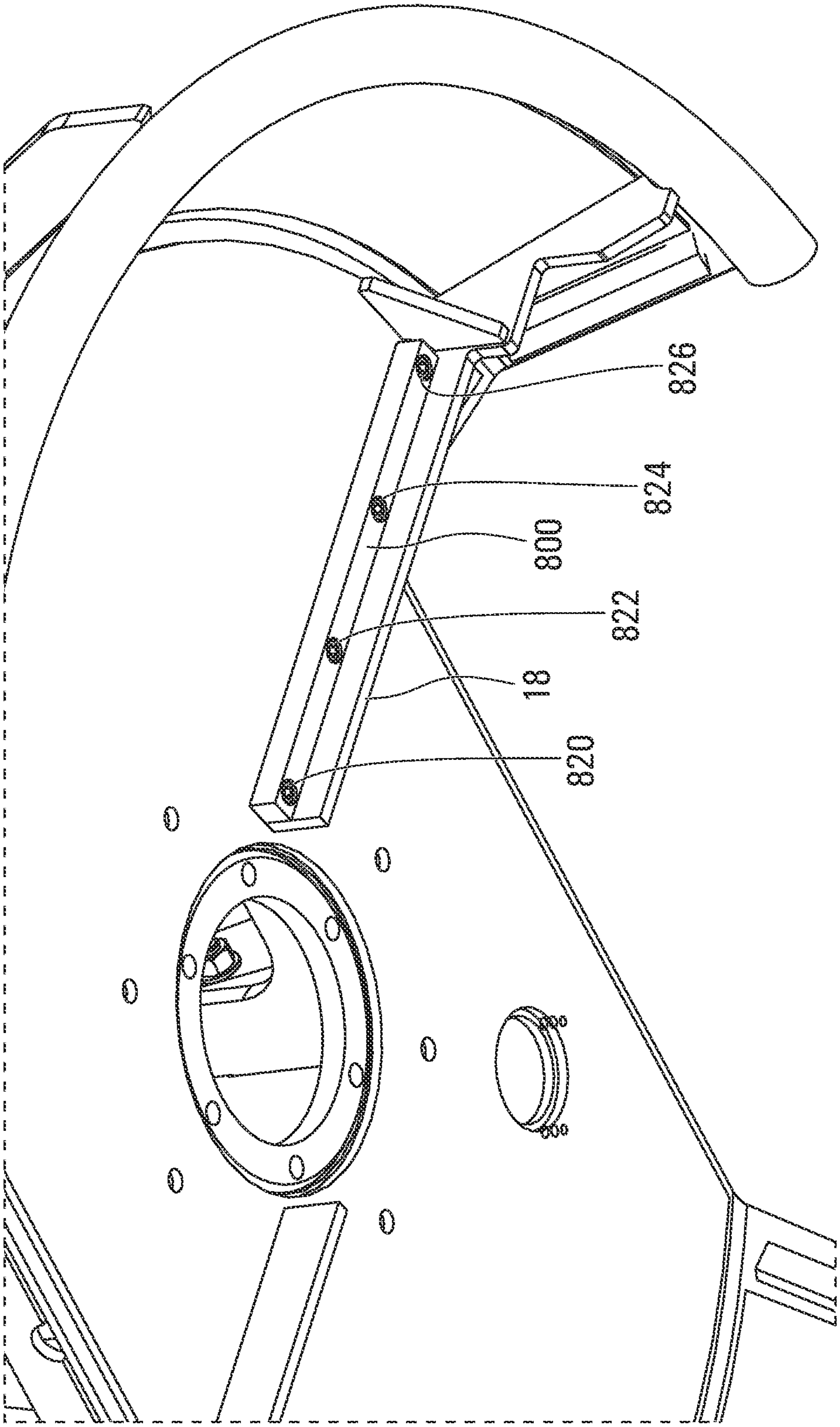
FIG. 14 is a lower angled view of a shearing governor of the apparatus shown in FIG. 1 according to various embodiments.

In various embodiments, an apparatus generally similar to the apparatuses 10 and 500 may include a shearing governor that is removably coupled to the base via at least one fastener. For example, in some embodiments, the apparatus may include one or more fasteners, such as, for example, bolts, configured to bolt the shearing governor to the base from a top side of the base. Referring to FIG. 14, there is shown the shearing governor 18 of the apparatus 10 according to various embodiments. Referring to FIG. 14, in the embodiment shown, the shearing governor 18 includes a holder 800. In some embodiments the holder 800 may act as a mounting bracket and/or a reinforcer for the shearing governor 18. In various embodiments, the shearing governor 18 may include bolts 820, 822, 824, and 826 which are configured to pass through respective openings in the holder 800 to threadably engage with the base 12 or a frame coupled to the base 12 of the apparatus 10 shown in FIG. 1, and to rigidly couple the holder 800 and the shearing governor 18 to the base 12.

In some embodiments, the shearing governors 18 and 518 of the apparatuses 10 and 500 described herein and shown in FIGS. 1-13 may include fewer, additional, and/or alternative cutting edges to those described above. For example, in some embodiments, the interposed cutting edge 700 of the apparatus 500 shown in FIGS. 10-13 may be included in an apparatus generally similar to the apparatus 10 shown in FIGS. 1-10. In some embodiments, an apparatus generally similar to the apparatus 10 or 500 shown in FIGS. 1-13 may omit any or all of the transverse cutting edges, outer cutting edges, and/or interposed cutting edges, or include additional transverse cutting edges, outer cutting edges, and/or interposed cutting edges, for example.

In various embodiments, axially when used herein may be understood to refer to a direction aligned with the rotation axis of the cutter disc 14, 514, and/or 614 shown in FIGS. 1-13. In various embodiments, radially when used herein may be understood to refer to a direction perpendicular to and extending from the rotation axis of the cutter disc 14, 514, and/or 614 shown in FIGS. 1-13.

While specific embodiments of the present disclosure have been described and illustrated, such embodiments should be considered illustrative of the present disclosure only and not as limiting the present disclosure as construed in accordance with the accompanying claims.

The invention claimed is:

1. An apparatus for facilitating processing of plant material, the apparatus comprising:

a base;

a cutter disc rotatably coupled to the base such that the cutter disc is configured to rotate about an axis of rotation relative to the base, the cutter disc having an upper side including a plurality of radially spaced teeth, each of the plurality of teeth configured to travel on a respective cutting path to engage and shear the plant material when the cutter disc rotates; and a shearing governor rigidly coupled to the base, the shearing governor including one or more cutting edges extending transverse to and axially spaced from the cutting paths of at least two of the plurality of teeth and configured to shear the plant material when the cutter disc rotates;

wherein the shearing governor includes a governing surface configured to guide the plant material when the cutter disc rotates; and wherein the shearing governor includes a flat plate, the governing surface includes a surface of the flat plate, and the one or more cutting edges include a transverse cutting edge adjacent to and axially spaced from the cutting paths of at least two of the plurality of teeth, the transverse cutting edge comprising a right-angled corner of the flat plate.

2. The apparatus of claim 1 wherein the governing surface is parallel to the axis of rotation.

3. The apparatus of claim 1 wherein the governing surface is obliquely angled relative to directions of the cutting paths of the teeth such that the governing surface is configured to urge plant material rotating with the upper side of the cutter disc towards the axis of rotation when the cutter disc rotates.

4. The apparatus of claim 1 wherein the governing surface is planar.

5. The apparatus of claim 1 further comprising a cover mounted to the base and covering at least a portion of the upper side of the cutter disc, the cover defining an inlet exposing at least a portion of the upper side of the cutter disc and a covered passage extending from the inlet, the covered passage adjacent to the upper side of the cutter disc, wherein the governing surface extends from the cover to narrow the covered passage at a location spaced apart from the inlet.

6. The apparatus of claim 1 wherein the transverse cutting edge extends above the cutter disc for a length of more than about half of a radius of the cutter disc.

7. The apparatus of claim 6 wherein the transverse cutting edge extends above the cutter disc for a length of more than about 80% of the radius of the cutter disc.

8. The apparatus of claim 1 wherein each of the one or more cutting edges is an inner cutting edge and the shearing governor includes an outer cutting edge oriented generally parallel to the axis of rotation, the outer cutting edge axially overlapping with and radially spaced from the cutting path of at least one of the plurality of teeth.

9. The apparatus of claim 8 wherein the outer cutting edge and the transverse cutting edge form a continuous cutting edge.

10. The apparatus of claim 1 wherein the shearing governor is removably coupled to the base via at least one fastener.

11. The apparatus of claim 1 wherein the one or more cutting edges of the shearing governor includes at least one interposed cutting edge disposed between respective cutting paths of two of the plurality of teeth.

12. A system for facilitating processing of plant material, the system comprising:

the apparatus of claim 1; and a drive system coupled to the apparatus and configured to drive the cutter disc of the apparatus to cause the cutter disc to rotate relative to the base of the apparatus.

* * * * *